Figure 7:
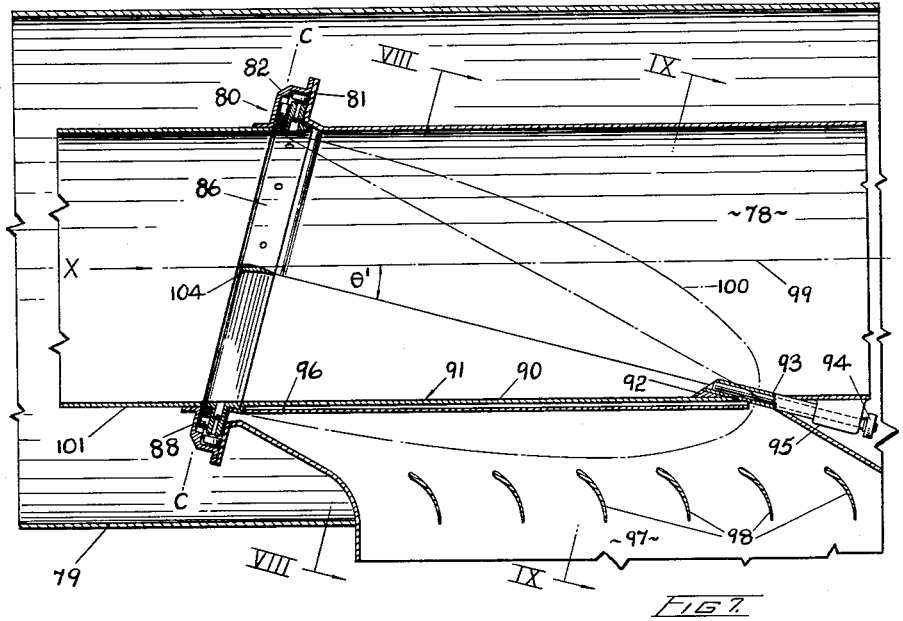

July 25, 1961 J. A. C. HYDE 2,993,513
VALVE STRUCTURE
Filed July 21, 1958 10 Sheets-Sheet 1
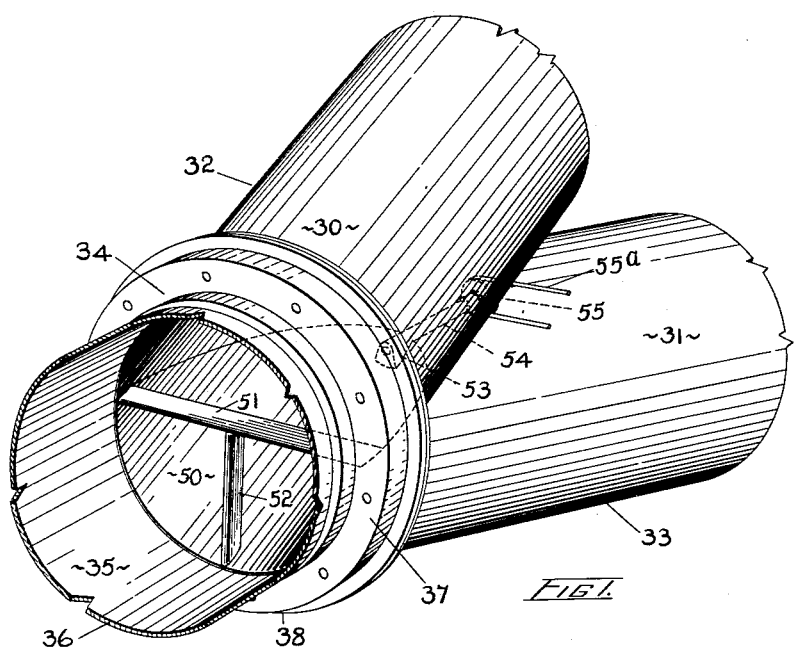
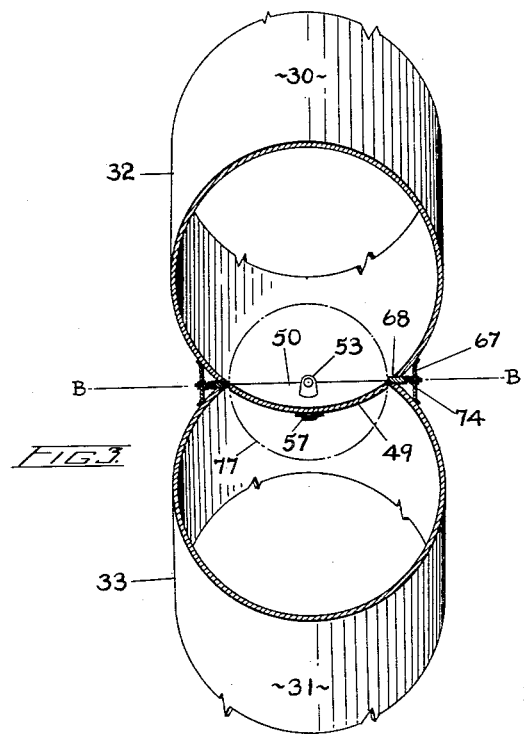
INVENTOR
J. A. C. HYDE
BY
Maybee & Legris
ATTORNEYS.

July 25, 1961 J. A. C. HYDE 2,993,513
VALVE STRUCTURE
Filed July 21, 1958 10 Sheets-Sheet 2
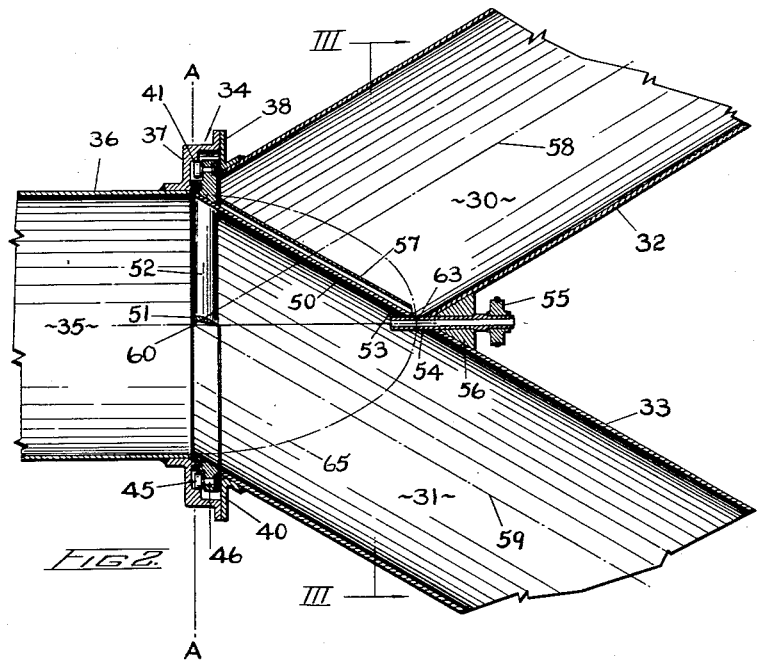
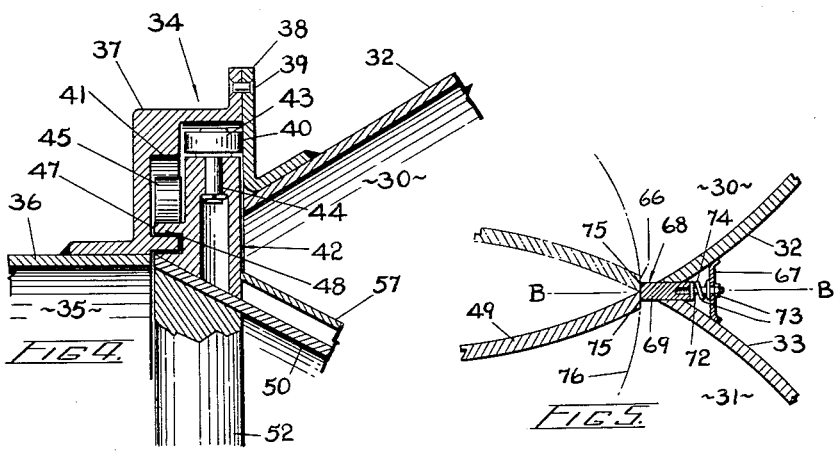
INVENTOR
J. A. C. HYDE
BY
Maybee & Legris
ATTORNEYS

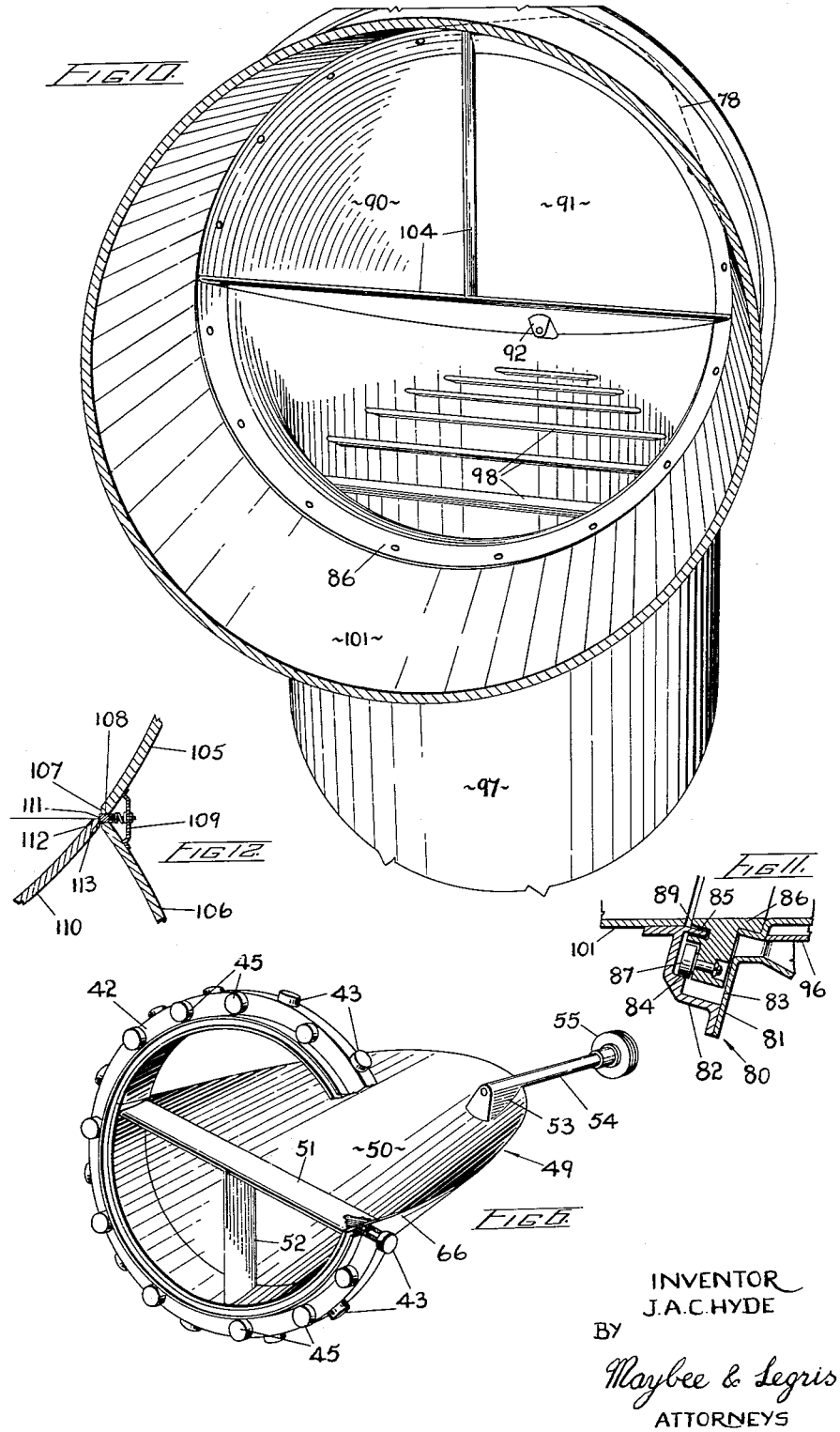

July 25, 1961 J. A. C. HYDE 2,993,513
VALVE STRUCTURE
Filed July 21, 1958 10 Sheets-Sheet 4

INVENTOR
J. A. C. HYDE
BY
Maybee & Legris
ATTORNEYS

July 25, 1961 J. A. C. HYDE 2,993,513
VALVE STRUCTURE

Filed July 21, 1958 10 Sheets-Sheet 5

INVENTOR
J. A. C. HYDE
BY
Maybee & Legris
ATTORNEYS

July 25, 1961 J. A. C. HYDE 2,993,513
VALVE STRUCTURE
Filed July 21, 1958 10 Sheets-Sheet 7
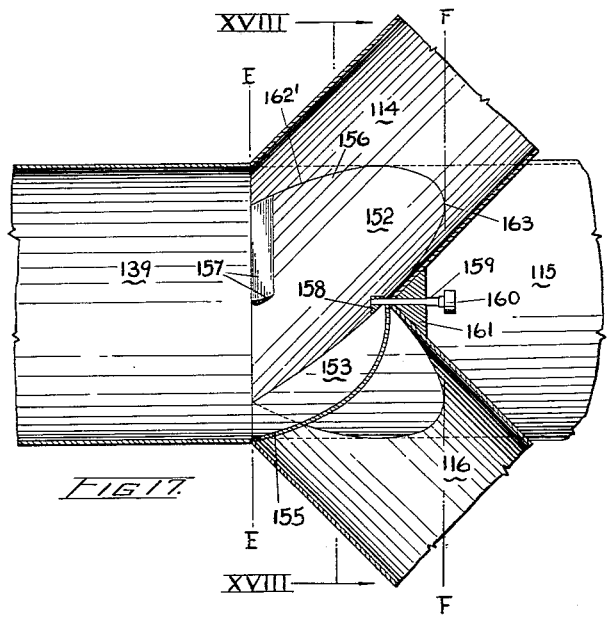
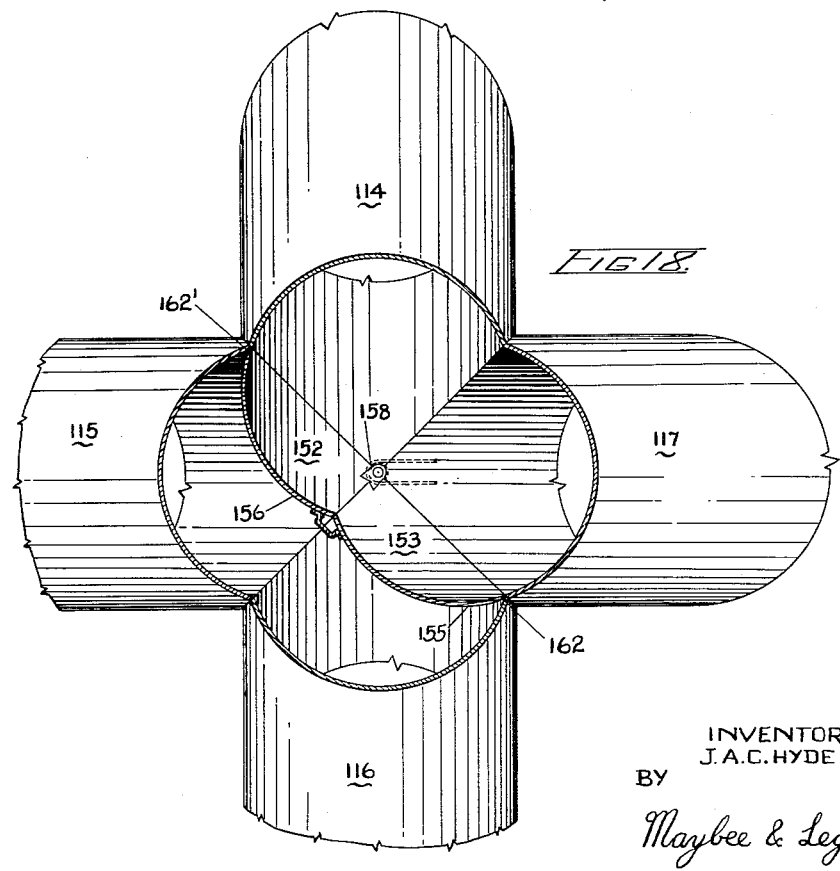
INVENTOR
J. A. C. HYDE
BY
Maybee & Legris
ATTORNEYS July 25, 1961  J. A. C. HYDE  2,993,513
VALVE STRUCTURE
Filed July 21, 1958  10 Sheets-Sheet 8
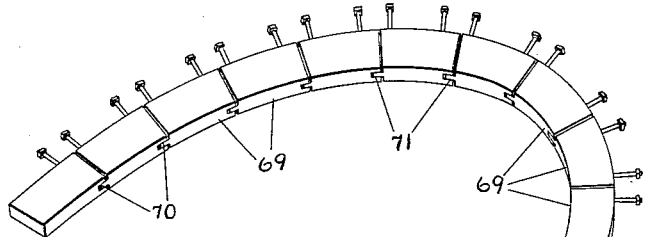
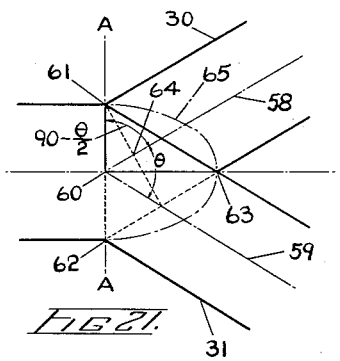
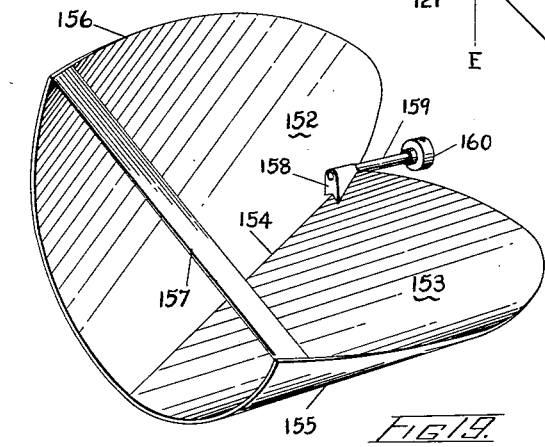
INVENTOR
J. A. C. HYDE
BY
Maybee & Legris
ATTORNEYS July 25, 1961 J. A. C. HYDE 2,993,513
VALVE STRUCTURE
Filed July 21, 1958 10 Sheets-Sheet 9
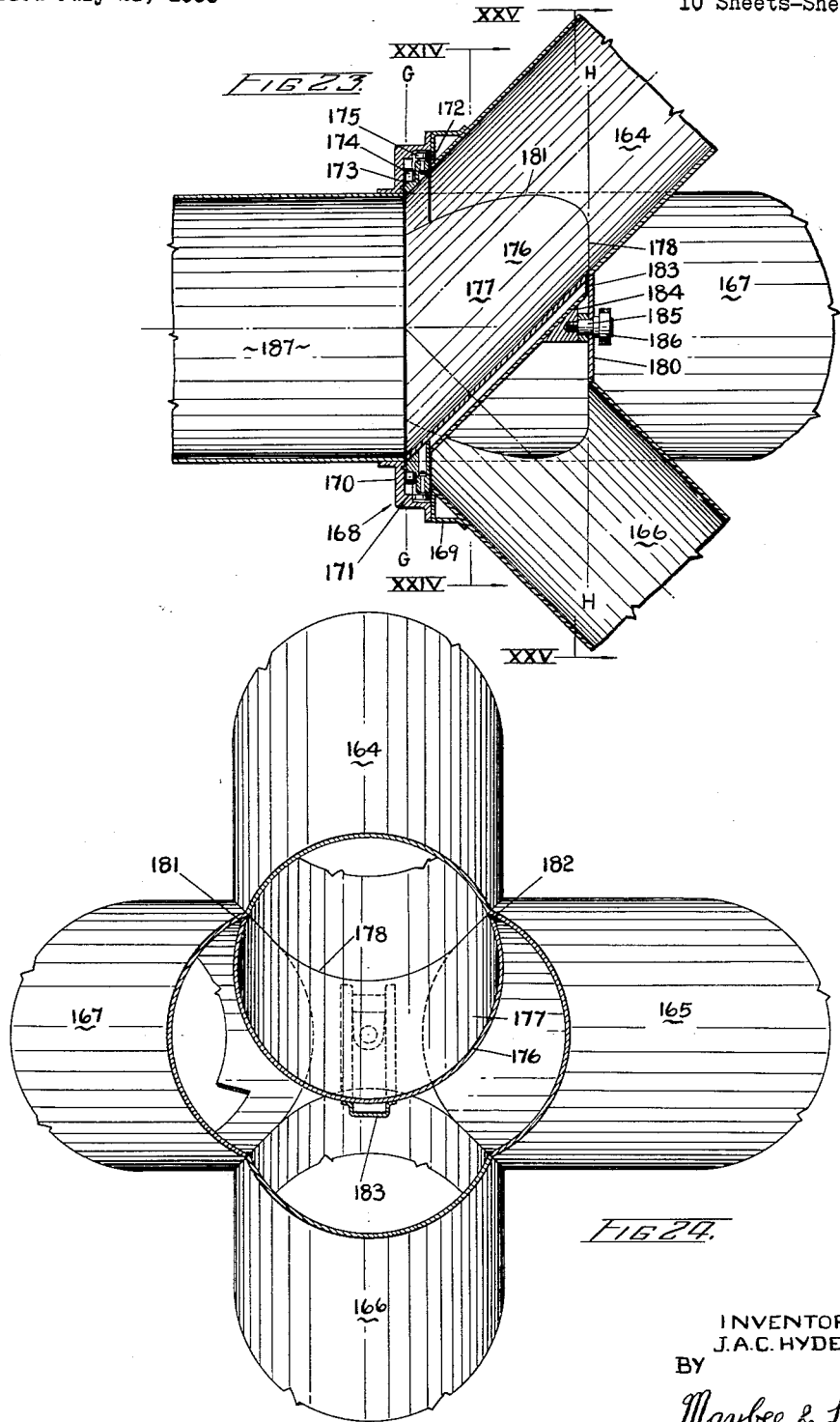
INVENTOR
J.A.C. HYDE
BY
Maybee & Legris
ATTORNEYS July 25, 1961 J. A. C. HYDE 2,993,513
VALVE STRUCTURE
Filed July 21, 1958 10 Sheets—Sheet 10
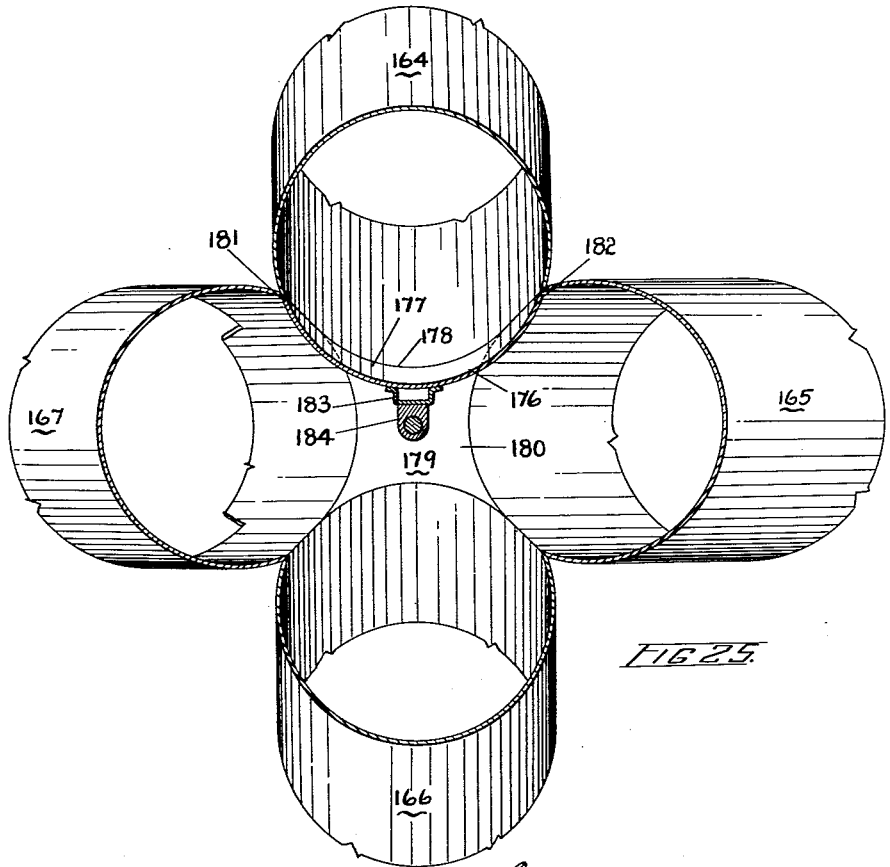
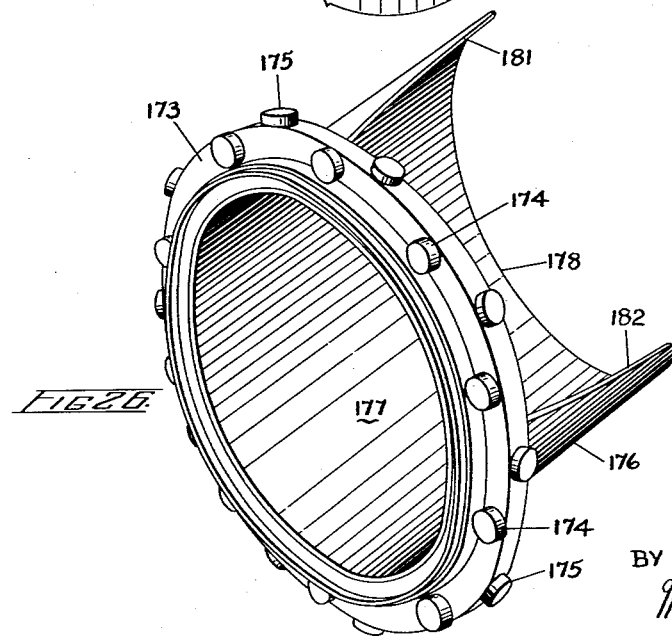
INVENTOR
J.A.C. HYDE
BY
Maybee & Legris
ATTORNEYS

United States Patent Office 2,993,513
Patented July 25, 1961

2,993,513
VALVE STRUCTURE
John Alan Courtney Hyde, Georgetown, Ontario, Canada, assignor to Orenda Engines Limited, Malton, Ontario, Canada, a corporation
Filed July 21, 1958, Ser. No. 749,717
7 Claims. (Cl. 137—625.11)

This invention relates to valve structure and more particularly to valve structure arranged to divert the flow of fluid between ducts. One application of the valve structure according to the invention is in aircraft having reaction propulsion units; the valve structure being used to divert the propulsive gases of the propulsion units.

In its application to aircraft, the valve structure may be used in vertical take-off aircraft to direct the propulsive gases vertically downwardly. Another application to aircraft is to divert the propulsive gases through downwardly inclined nozzles in the aircraft wings, thus reducing the aircraft stalling speed and permitting shorter and lower speed take-offs and landings than with conventional equipment. However, the valve structure is not limited to these applications and may be used in any duct work where it is desired to deflect fluid flow from one duct to another.

One object of the invention is to provide valve structure in which fluid flow may be diverted while encountering only very low flow resistance in all operative positions of the valve structure.

A further object of the invention is to provide valve structure which offers low resistance to fluid flow and requires relatively little power to operate it.

A yet further object of the invention is to provide a valve structure which offers low resistance to fluid flow and which is inexpensive to manufacture and simple to operate.

Figure 8:
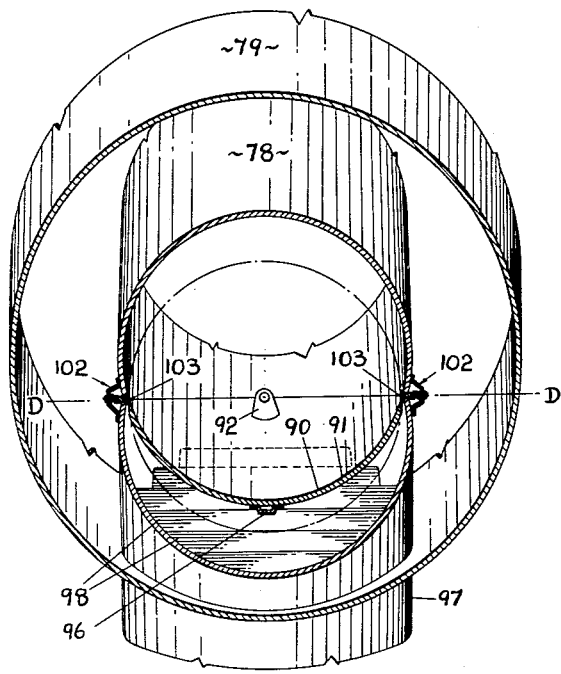
Figure 9:
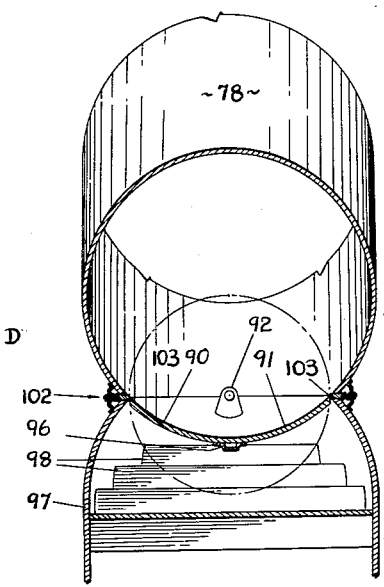
Figure 13:
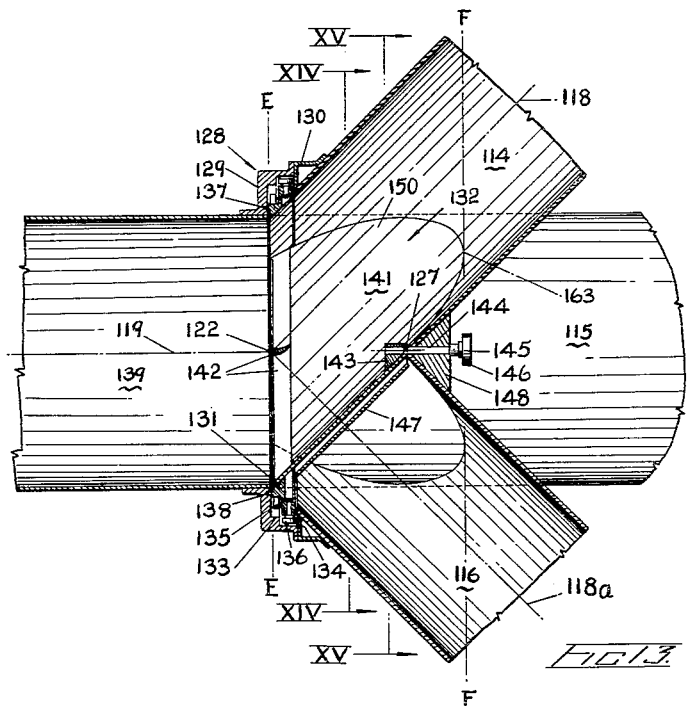
Figure 14:
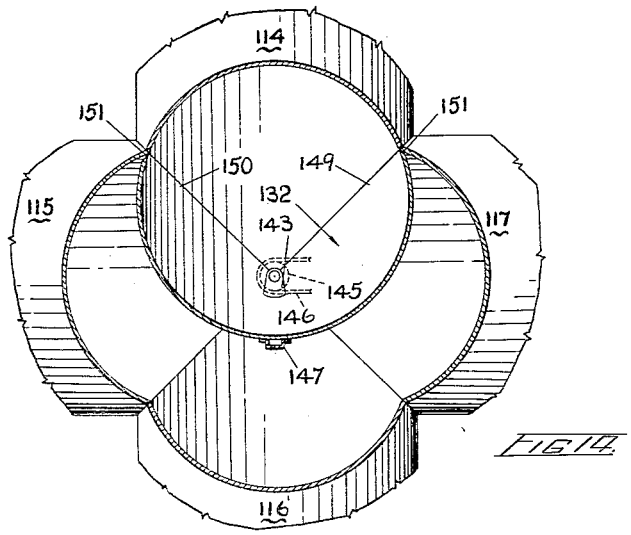
Figure 16:
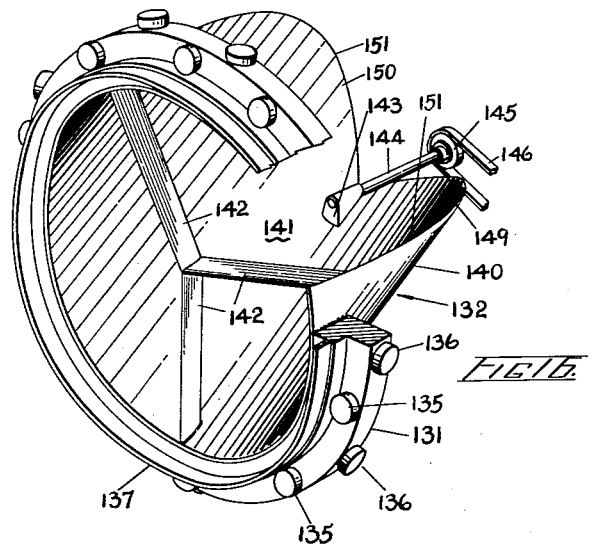
Figure 15:
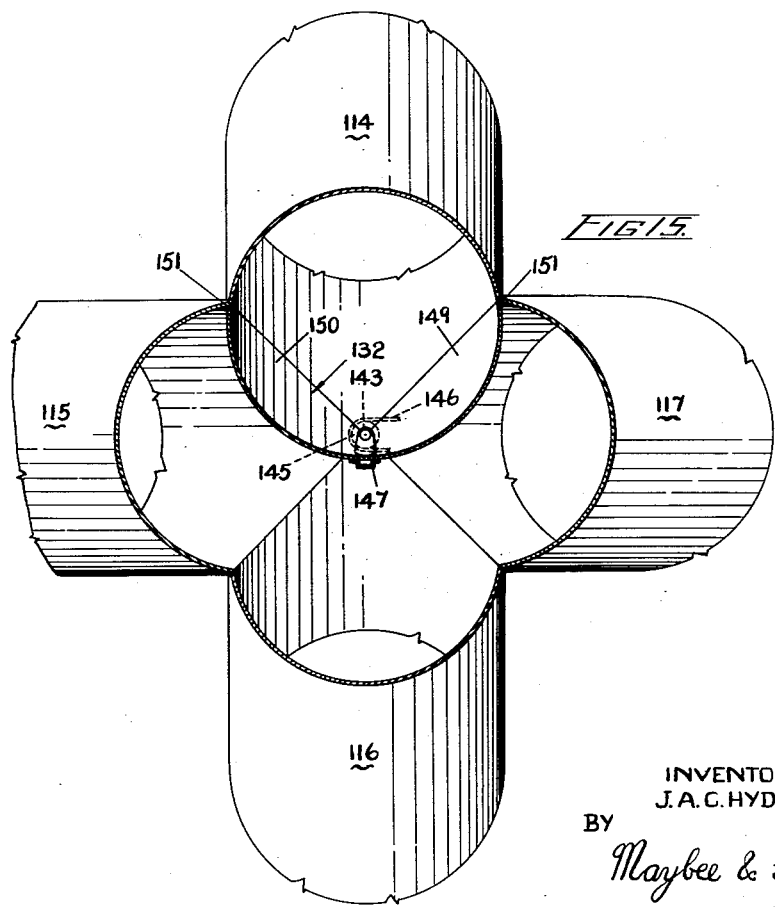

Other objects and advantages of the invention will become apparent from the following specification in in which the invention is described by way of example with reference to the accompanying drawings in which like reference numerals refer to like parts in the several views, and in which:

FIGURE 1 is a perspective view, partly broken away, of one embodiment of the invention, FIGURE 2 is a longitudinal section of the valve structure shown in FIGURE 1, FIGURE 3 is a transverse cross-section on the line III—III of FIGURE 2, FIGURE 4 is a detail, on a larger scale, showing the means of supporting the valve member in the embodiment shown in FIGURES 1 to 3, FIGURE 5 is a detail, on a larger scale, of the sealing means used to seal an edge of the valve member in the embodiment shown in FIGURES 1 to 3, FIGURE 6 is a perspective view, partly broken away, of the valve member of the embodiment of the invention shown in FIGURES 1 to 3, FIGURE 7 is a longitudinal section of a second embodiment of the invention as applicable to a vertical take-off aircraft, FIGURE 8 is a transverse cross-section on the line VIII—VIII of FIGURE 7, FIGURE 9 is a transverse cross-section on the line IX—IX of FIGURE 7, FIGURE 10 is a perspective view of the embodiment of the invention shown in FIGURE 7 looking in a direction of the arrow X in FIGURE 7, the outer pipe being omitted, FIGURE 11 is a detail, on a larger scale, showing the means of supporting the valve member in the embodiment of the invention shown in FIGURES 6 to 9, FIGURE 12 is a detail, on a larger scale, showing alternative means of sealing an edge of the valve member, FIGURE 13 is a longitudinal section of a third embodiment of the invention, FIGURE 14 is a transverse section on the line XIV—XIV of FIGURE 13, FIGURE 15 is a transverse section on the line XV—XV of FIGURE 13, FIGURE 16 is a perspective view, on a larger scale and partly broken away, of the valve member of the embodiment of the invention shown in FIGURES 13 to 15, FIGURE 17 is a transverse section of a fourth embodiment of the invention, FIGURE 18 is a transverse section on the line XVIII—XVIII of FIGURE 17, FIGURE 19 is a perspective view of the valve member of the embodiment of the invention shown in FIGURES 17 and 18, FIGURE 20 is a perspective view of the seal which is seen in section in FIGURES 5 and 12, FIGURE 21 is a diagram showing the geometrical orientation of the ducts of the embodiment of FIGURES 1 to 3, FIGURE 22 is a diagram showing the geometrical orientation of the ducts in the embodiments shown in FIGURES 13 to 15, and 17 and 18, FIGURE 23 is a longitudinal section of a fifth embodiment of the invention, FIGURE 24 is a transverse section on the line XXIV—XXIV of FIGURE 23, FIGURE 25 is a transverse section on the line XXV—XXV of FIGURE 23, and FIGURE 26 is a perspective view, on a larger scale of the valve member of the embodiment shown in FIGURES 23 to 35.

Referring now to FIGURES 1 to 6, the embodiment of the invention illustrated comprises two ducts 30, 31 of elliptical cross-section, the ducts intersecting and terminating adjacent to a plane indicated at A—A in FIGURE 2. The ducts have sheet metal walls indicated at 32 and 33 and are embraced adjacent to the plane A—A by an annular member indicated generally at 34 to which is also connected a further duct 35 having sheet metal walls 36. The annular member 34 comprises two annular elements 37 and 38 connected together by rivets 39, as indicated in FIGURE 4. The annular element 38 has a first annular bearing surface 40 parallel to the plane A—A, and the annular element 37 has a second annular bearing surface 41 perpendicular to the plane A—A. Mounted within the annular member 34 is a collar indicated generally at 42; the collar carrying two sets of rollers around its periphery as shown in FIGURE 6. One set of rollers, the individual rollers being indicated at 43, are pivoted about pins 44 extending radially through the collar, while the other set of rollers, the individual rollers being indicated at 45, are pivoted on pins 46, shown in FIGURE 2, extending axially from the collar.

Referring now to FIGURE 4, a peripheral rib 47 is formed in the annular element 37 and a peripheral groove 48 is formed on the collar 42, the rib 47 being received in the groove 48 and forming a labyrinth seal.

Mounted within the bores of the ducts 30 and 31 at their intersection is a valve member shown in FIGURE 6. The valve member includes the collar 42 on which is mounted a thin curved shell 49 which provides an operative deflecting surface 50. The shell is braced within the collar by struts 51, 52 arranged in T-shaped configuration and, as shown in FIGURE 2, each having an aerofoil section. At the end of the valve member remote from the collar 42 is a trunnion block 53 from which projects a sleeve 54; the sleeve carries at its free end a pulley wheel 55. Referring now to FIGURE 2, it will be seen that the sleeve 54 passes through the walls of the ducts 30 and 31 at their point of intersection furthest from the plane A—A, the sleeve being supported by a fillet 56 outside the ducts. As shown in FIGURE 1 the pulley 55 is embraced by a belt 55a and may be rotated by any conventional driving means. On its exterior surface the valve member is provided with a flanged channel section member 57 which is connected to the trunnion block 53 at one end and to the collar 42 at its other end. The flanged channel member 57 reinforces the valve member and prevents buckling so that rotation of the sleeve 54 by the pulley 55 rotates the valve member causing the collar 42 to rotate within the annular member 34.

The ducts 30, 31 are orientated relatively to one another so that their longitudinal axes, indicated at 58 and 59 respectively, intersect in a point 60 in the plane A—A, and so that the minor axes of the ellipses of the cross-sections of the respective ducts at any transverse section of the structure lie in a plane. (In his specification and the appended claims, the word "axis" is used in the sense of a line of infinite length passing down the centre of a duct; the axis is not taken as terminating at the end of the duct itself.) The angles between the axes of the ducts and the plane A—A are so chosen that the cross-sections of the ducts 30 and 31, when projected on to the plane A—A, project into a common circle. This is best shown in FIGURE 21 in which are in which are indicated in outline the ducts 30 and 31 with their longitudinal axes 58 and 59 intersecting in the plane A—A in the point 60.

The projection of the cross-section of the duct 30 on the plane A—A is a circle whose diameter is equal to the distance between the points 61 and 62. Similarly the projection of the cross-section of the duct 31 on to the plane A—A is the same circle. This arrangement is effected by making the ratio of the length of the minor axis to the length of the major axis of the ellipse forming the cross-section of the ducts 30 and 31, equal to the cosine of half the angle between the axes of the ducts and by making the plane A—A perpendicular to the bisector of the angle between the longitudinal axes 58 and 59. Referring to FIGURE 21, which is a section in the plane containing the minor axes of the cross-sectional ellipses, if the angle between the longitudinal axes 58 and 59 is $\theta$, as shown and the bisector of the angle $\theta$, i.e. the line 60, 63 is perpendicular to the plane A—A, then the angle between the longitudinal axis 58 and the plane A—A is $90° - \theta/2$. If a perpendicular is dropped from the point 61 on to a longitudinal axis 58, as indicated by the line 61, 64, it is possible to calculate the ratio between the major and minor axes of the ellipse forming the cross-section of the ducts, since the radius of the circle into which the cross-sections of the ducts project is equal to a length between the ponts 60, 61 and is also equal to half the major axis of the ellipse forming the cross-section of the ducts. It follows then that the ratio between half the length of the minor axis, i.e. the length of the line 61, 64 to half the length of the major axis, i.e. the length of the line 61, 60, and therefore the ratio between the lengh of the minor axis and the length of the major axis is sine $90° - \theta/2$, which equals cosine $\theta/2$. The same analysis may be carried out for the duct 31 leading to the same result, since the cross-sections of the ducts 30 and 31 are identical.

If the ducts 30 and 31 intersected the plane A—A they would do so in the common circle having a diameter defined by the points 60 and 61; the centre of the circle being the point 60. Moreover, the ducts would intersect along the line 60, 63 in a plane perpendicular to the paper and in a semi-ellipse whose configuration is indicated at 65 in FIGURE 21. Since, however, in the embodiment shown in FIGURES 1 to 6, the ducts 30 and 31 terminate short of the plane A—A due to the interposition of the annular member 34, the intersection between the ducts will not be a true semi-ellipse similar to that indicated at 65 in FIGURE 2 (which is the same semi-ellipse as indicated at 65 in FIGURE 21) but will be substantially a semi-ellipse except for that portion which is cut-off by the annular member 34 and the collar 42, that is to say it will be a semi-ellipse from the point of intersection of the ducts 30, 31 furthest from the plane A—A, the point being indicated by the point 63 in FIGURE 21, up to approximately the plane defined by the mating faces of the annular elements 37, 38.

The valve member, as has been hereinbefore mentioned, comprises a curved shell 49. Referring to FIGURE 6, the operative surface 50 of this curved shell is a surface which is complementary to the surface of an elliptical cylinder having the same elliptical cross-section as the cross-section of the ducts 30 and 31. It follows, therefore, that in the position shown in FIGURE 2, the operative surface 50 of the valve member forms a continuation of the duct 31 to the plane A—A. The extent of the valve member is such that its longitudinal edges mate with the semi-elliptical aperture between the two ducs when the valve member is in such a posiion that the longitudinal edges of the curved surface lie in a plane perpendicular to the plane containing the minor axes of the cross-sectional ellipses, perpendicular to the plane A—A, and passing through the point 60; i.e. the plane containing the line B—B in FIGURE 3 and perpendicular to the plane A—A.

In the position shown in FIGURE 2, the valve member places the ducts 35 and 31 in communication while sealing off the duct 30 both from the duct 35 and the duct 31. Conversely, if the valve member is rotated about the axis 60—63 by the pulley 55 and belt 55a to the position shown in FIGURE 1, the ducts 35 and 30 are in communication and the duct 31 is sealed off both from the duct 35 and the duct 30. When the valve member is in the position shown in FIGURE 2, the axis of the imaginary cylinder of elliptical cross-section to the surface of which the surface 50 of the valve member is complementary, is co-incident with the longitudinal axis 59 of the duct 31. Conversely, when the valve member is in the position shown in FIGURE 1, the axis of the cylinder is co-incident with the longitudinal axis 58 of the duct 30.

The ducts are connected together by the annular member 34 and also by a flanged member 67, shown in FIGURES 3 and 5, which surrounds their semi-elliptical intersection. The flanged member 67 is welded to both ducts and also provides a support for a seal which is indicated generally at 68 in FIGURES 3 and 5. The seal is of the type shown in FIGURE 20 and consists, referring to FIGURE 20, of a plurality of elements 69 arranged in a generally semi-elliptic configuration to surround the semi-elliptic aperture at the intersection of the ducts 30 and 31. One lateral edge of each element 69 is provided with a tongue 70 while the other lateral edge is provided with a groove 71 so that the elements are tongued and grooved into one another as shown. The elements are thus able to expand radially without losing their sealing effectiveness since, during expansion, the tongues 70 remain in the grooves 71. Projecting radially outwardly from the outward edges of the element, are pins 72 carrying nuts 73.

When the seal is in position, as shown in FIGURES 3 and 5, compression springs 74 are interposed between the elements 69 and the flanged member 67, and the pins 72 pass through the springs and the flanged member 67 and are retained in place by the nuts 73. It is apparent that the tension of the springs may be adjusted by tightening or loosening the nuts 73. The inner edges of the elements 69 are chamfered as at 75 and the elements 69 engage the longitudinal edges 60 of the thin shell 49. In the embodiment shown in FIGURES 1 to 5, the longitudinal edges 66 of the valve member are slightly rounded to conform in contour to their path as they are rotated.

Each point on the edge of the valve member will describe a circle as the valve member is rotated; for the point illustrated in FIGURE 5, the circle is indicated at 76 and the edges are shaped to conform to this circle. In the full line and phantom line positions of the valve member shown in FIGURE 5, the longitudinal edges 66 lie in the plane containing the line B—B and perpendicular to the plane A—A, i.e. in the plane of intersection of the ducts. The chamfered edges 75 of the sealing elements 69 are provided to prevent the elements jamming the valve member as the valve member turns, the chamfers ensuring that the elements will retract as the edge of the valve member comes into contact with them during turning.

Viewed in planes parallel to the plane A—A, the curved shell 49 of the valve member appears as arcs of a circle although in fact the surface is elliptical. If viewed in planes normal to the surface then, of course, the shell would appear as an elliptical arc. Thus, in FIGURE 3, the section of the valve member there shown appears as an arc of a circle and the dotted circle 77 indicates the path of the edges of the valve member at that point as the valve member rotates.

The operation of the embodiment described is as follows: the valve member is rotatable through 360° by sleeve 54 and pulley 55 about an axis coincident with the axis of the sleeve, the axis being perpendicular to the plane A—A and passing through the point 60 i.e. the point of intersection of the longitudinal axes 58, 59 of the ducts 30 and 31. The valve member has first and second positions in which one of the ducts 30, 31 is cut off from the other of the ducts 30, 31 and is placed in communication with the duct 35. One of these positions, the first position, is shown in FIGURE 1, where the duct 31 is sealed off from the ducts 35 and 30 and fluid may flow from the duct 35 into the duct 30 or vice-versa. If the valve member is now turned through 180° to the position shown in FIGURE 2, the duct 30 is sealed off from the ducts 31 and 35 and fluid may flow from the duct 35 into the duct 31 or vice-versa. Since the curved operative surface 50 of the valve member is a surface complementary to a cylinder having a cross-section identical to the cross-section of the ducts 30, 31, the surface 50 is, when in either of its first and second positions, in effect an extension of the surface of one of the ducts. Thus, in the position shown in FIGURE 2, the surface 50 is an extension of the bore of the duct 31, so that there is virtually no resistance to flow offered to fluid passing between the ducts 31 and 35. A slight resistance will be introduced by the trunnion block 53 and by the struts 51 and 52 but this is negligible. It is apparent that, during rotation of the valve member between the first and second positions, if fluid is supplied to the duct 35 it will flow through both ducts 30 and 31 but, when the valve member comes into its first or second position, the longitudinal edge 66 of the valve member will seal round the periphery of the semi-elliptical aperture between the two ducts and fluid diversion into one or other of the ducts will be effected with very little resistance.

Referring now to FIGURES 7 to 11, the second embodiment of the invention uses a valve member which is in many respects similar to that described in relation to the embodiment of FIGURES 1 to 6. The embodiment shown in FIGURES 7 to 11 is of a type which is applicable to a reaction propulsion unit of an aircraft.

Referring now to FIGURES 7 to 11, a duct of elliptical cross-section is indicated at 78 and is surrounded by an outer pipe 79. The duct terminates adjacent to a plane C—C, which is at an angle to the longitudinal axis of the duct, and is embraced by an annular member indicated generally at 80 and consisting of annular elements 81 and 82. Referring to FIGURE 11, the annular element 81 is provided with an annular bearing surface 83 parallel to the plane C—C and the annular bearing element 82 is provided with an annular bearing surface 84 perpendicular to the plane C—C. A peripheral rib 85 is provided on the element 82 and is perpendicular to the plane C—C. A collar 86 is rotatably mounted within the annular member and has rollers 87 engaging the annular surface 84 and rollers 88 (see FIGURE 7) engaging the annular bearing surface 83. The collar 86 also has a peripheral groove 89 in which is received the rib 85, the groove and the rib together forming a labyrinth seal.

The collar 86 forms part of a valve member which also includes a thin curved shell 90 having an operative deflecting surfaces 91. Aerofoil section struts 104 brace the shell in the collar. A trunnion block 92 is provided at the end of the curved shell remote from the plane C—C and is connected to a sleeve 93 which passes out through the duct wall and is provided with a pulley 94. The sleeve 93 is supported outside the duct by a housing 95. A flanged channel section member 96 is welded to the exterior of the shell between the trunnion block 92 and the collar 86. As in the embodiment previously described, rotation of the pulley 94 causes the valve member to rotate about its axis.

The operative surface 91 of the valve member is a concave surface which is complementary to the surface of a cylinder having a cross-section identical to that of the duct 78. Communicating with the duct 78 through an aperture therein is a second duct 97 in which are mounted deflecting vanes 98. The duct 97 passes through the outer pipe 79 as shown in FIGURES 7 and 8. The aperture through which the ducts 78 and 97 communicate is substantially semi-elliptical and the edge of the aperture lies in a plane perpendicular to the plane C—C, the plane containing the point of intersection of the plane C—C and the longitudinal axis of the duct 78 and the line D—D in FIGURE 8.

The relative orientations of the plane C—C and the duct 78 are arranged such that if the duct 78 were to intersect the plane C—C it would do so in a circle and so that the cross-section of the duct projects onto the plane as a circle. This is attained by making the ratio of the length of the minor axis to the length of the major axis of the ellipse forming the cross-section of the duct 78 equal to the cosine of the angle $\theta'$ between the longitudinal axis 99 of the duct 78 and the perpendicular to the plane C—C through the point of intersection of the plane with the longitudinal axis 99. This will be seen if the embodiment of FIGURES 7 to 11 is compared with FIGURE 21. The construction of the second embodiment is, as it were, half of the embodiment shown in FIGURES 1 to 6. Thus, the line 60—63 corresponds to the perpendicular in FIGURE 7, the plane A—A corresponds to the plane C—C, the duct 30 corresponds to the duct 78 and the angle $\theta/2$ corresponds to $\theta'$.

In the embodiment shown, the duct 78 does not intersect the plane C—C because of the interposition of the annular member 80. If the duct did intersect the plane, the aperture between the ducts 78 and 98, the edge of which lies in the plane perpendicular to the plane C—C and containing the line D—D, would be a complete semi-ellipse of the form shown at 100 in FIGURE 7. Because of the interposition of the annular member 80, the aperture is not a complete semi-ellipse but is substantially so. The extent of the operative surface 91 of the valve member is such that the longitudinal edges of the valve member can seal round the aperture and, in one position, the position shown in FIGURES 7, 8 and 9, the operative surface forms a continuation of the duct 78 to the plane C—C.

In FIGURES 7, 8 and 9 the valve member is in a first position and places the duct 78 in communication with a further duct 101 attached to the annular member 80, while in FIGURE 10 the valve member is shown in a second position placing the duct 101 in communication with the duct 97 and sealing off the duct 78 from both the ducts 97 and 101. A seal 102, constructed in the same way as that described at 68 with reference to the previous embodiment, is provided round the edge of the substantially semi-elliptical aperture. In FIGURES 8 and 9 it will be seen that the longitudinal edge 103 of the valve member mates with seal 102 in the first position of the valve member. If the valve member is turned through 180° to the second position, shown in FIGURE 9, the edges 103 of the valve member will again mate with the seal 102 round the edges of the substantially semi-elliptical aperture and the duct 78 will be sealed off from the ducts 98 and 101 which will be placed in communication.

In the application of this embodiment to a reaction propulsion unit of an aircraft, the exhaust gases from the turbine of the reaction propulsion unit would be delivered along the duct 101 and would normally flow out along the duct 78 to an exhaust nozzle. The valve member would be in the first position shown in FIGURES 7, 8 and 9 so that the ducts 101 and 78 would form a single duct with virtually no obstruction except for the trunnion block 92. When it was desired to deflect the propulsive gases out through the duct 98, the valve member would be turned through a 180° to the second position shown in FIGURE 10 and the propulsive gases would then flow from the duct 101 into the duct 97 and would provide a vertical propulsive force; the vanes 98 help to ensure a smooth flow.

Referring now to FIGURE 12 there is shown a slightly different form of seal from that shown in FIGURE 5. In the form shown in FIGURE 12, the mating edges of a pair of ducts 105, 106 have been relieved to produce a flat surface 107 through which project sealing elements 108 similar to the sealing elements 69 and mounted in a flanged member 109 in the same manner as in FIGURE 5. The edges of a valve member 110 indicated at 111 are provided with a pair of flattened surfaces 112, 113 at right angles, the surface 113 mating with the sealing element 109.

Referring now to FIGURES 13 to 16, there is shown a third embodiment of the invention which includes four elliptical intersecting ducts and a further duct communicating with the four elliptical ducts.

The four ducts are indicated at 114, 115, 116 and 117 and each of them has an identical elliptical cross-section. The four ducts are orientated relatively to one another so that their cross-sections, if projected on to the plane E—E shown in FIGURE 13, project into a common circle.

This relative orientation is obtained by fulfilling two necessary conditions; the first condition is fulfilled by arranging the ducts so that their longitudinal axes lie on the curved surface of an imaginary right circular cone whose apex lies in the plane E—E and is the point of intersection of the longitudinal axes of the ducts. The longitudinal axes are equally spaced around the cone surface and the major axes of the cross-sectional ellipses, i.e. the ellipses forming the cross-sections of the ducts, are tangential to the curved surface of the cone. FIGURE 22 shows in diagrammatic form a section similar to the section shown in FIGURE 13, i.e. a transverse section on the line XIII—XIII of FIGURE 14. The plane in which the section is taken contains the longitudinal axes of two opposite ducts 114 and 116, the longitudinal axes being indicated at 118 and 118a respectively. Since the longitudinal axes of the ducts are equally spaced around the curved surface of the cone and since there are four axes, the angle subtended at the principal axis of symmetry of the cone, indicated at 119 in FIGURE 22, between two adjacent longitudinal axes, e.g. the longitudinal axes of the ducts 114 and 117, is 90°. Therefore, the longitudinal axes of the opposite ducts 114 and 116 lie in a plane, and the longitudinal axes of the ducts 115 and 117 will lie in another plane perpendicular to the plane containing the axes of the ducts 114 and 116.

The imaginary cone on which the longitudinal axes lie is obtained by rotating the lines 118, 118a about the principal axis of symmetry 119 of the cone. The line 119 is the bisector of the angle $\theta''$ between the axes 118 and 118a and is perpendicular to the plane E—E. It follows, therefore, that the angle between each longitudinal axis and the principal axis of symmetry 119 is $\theta''/2$.

Referring now to the duct 114, the circle projected on to the plane E—E by the cross-section of the duct is defined by the points 120, 121 and has as its centre the point 122 which is the point of intersection of the longitudinal axes of the ducts and is also the point of intersection of the principal of symmetry 119 of the cone with the plane E—E. In order that the figure projected by the cross-sections of the ducts on to the plane E—E be a circle, the second necessary condition is that the ratio of the length of the minor axis of the cross-sectional ellipse of the ducts to the length of the major axis of the ellipse be equal to cosine $\theta''/2$ i.e. the cosine of the semi-angle of the cone, since $\theta''$ is the apical angle of the cone.

This proposition may be proved in a manner similar to that which was adopted in relation to FIGURE 21. A perpendicular dropped from the point 120 on to the longitudinal axis 118 intersects it at a point 123. Since the plane containing the axes 118, 118a is perpendicular to the plane E—E it follows that the radius of the circle projected by the cross-section on to the plane E—E, i.e. the distance between the points 120, 122, must be equal to half the major axis of the ellipse forming the cross-section of the ducts. Considering the triangle 120, 122, 123, the ratio of the length of the line 120, 123 to the length of the line 120, 122 equals cosine $\theta''/2$. The length of the line 120, 123 is half the length of the minor axis of the ellipse forming the cross-section of the duct and the length of the line 120, 122 equals half the length of the major axis of the ellipse forming the cross-section of the duct, therefore, the ratio of the length of the minor axis of the ellipse to the length of the major axis of the ellipse is also equal to cosine $\theta''/2$. Since the configuration is symmetrical about the principal axis of symmetry 119 a similar analysis for any of the other ducts 115, 116 or 117 would lead to the same result.

If the ducts actually intersected the plane E—E it is clear that they would all do so in the circle whose diameter is the length of the line 120, 121 and whose centre is the point 122. Moreover, if the ducts intersected the plane E—E, each would intersect one of its adjacent ducts through an aperture whose edge would lie in a plane and would be lobe-shaped as indicated at 125 in FIGURE 22. The duct would communicate with its other adjacent duct through a second lobe-shaped aperture, as at 126, the edge of the aperture lying in a plane, said planes containing the edges of the apertures 125, 126 being at an angle to one another and each lobe-shaped aperture stretching from the plane E—E to a point 127. The edges of each lobe-shaped aperture form part of an ellipse.

Returning now to FIGURES 13 to 16, the ducts are embraced by an annular member indicated generally at 128 and having two annular elements 129 and 130. A collar 131 is mounted within the annular member 128 and carries two sets of rollers. The collar is shown in FIGURE 16 as forming part of a valve member indicated generally at 132. The annular element 129 is provided with a bearing surface 133 perpendicular to the plane E—E and the annular element 130 is provided with a bearing surface 134 parallel to the plane E—E. The rollers on the collar 131 are arranged in two sets, the rollers of the first set, which are indicated at 135, engaging the bearing surface 133 on the annular member, and the rollers of the second set, which are indicated at 136, engaging the bearing surface 134 on the annular element 130. A peripheral rib 137 on the collar 131 and a groove 138 in the annular element 129 provide complementary sealing means between the collar and the annular member. A further duct 139 is connected to the annular element 128 and extends from the plane E—E in an opposite direction to the ducts 114, 115, 116, and 117.

Referring now to FIGURE 16, the valve member 132 comprises, in addition to the collar 131 with its associated rollers, a thin curved shell 140 having an operative deflecting surface 141. The shell is braced within the collar 131 by struts 142 of areofoil cross-section. A trunnion block 143 is provided at the end of the valve member remote from the plane E—E and a sleeve 144 projects from the trunnion block and is provided with a pulley 145. A belt 146 embraces the pulley and may be connected to any conventional form of driving gear. Running from one end to the other of the valve member is a flanged channel section member 147 which reinforces the thin shell 140 so that the valve member may be turned by rotating the sleeve 144 without the shell buckling.

The valve member is shown in position in FIGURES 13, 14 and 15, and is best seen in FIGURE 13. The sleeve 144 passes out through the duct wall at the point 127, see FIGURE 22, and is supported outside the ducts by a fillet 148.

As in the previous embodiments of the invention, the operative surface 141 of the valve member is a concave surface complementary to a cylinder of cross-section identical to the cross-section of the ducts 114 to 117. As will be seen from FIGURE 16 the thin shell has two "ears" 149 and 150 which correspond to the lobe-shaped apertures 125, 126 shown in FIGURE 22. Since the surface 141 is complementary to the surface of a cylinder having a cross-section equal to the cross-section of the ducts, the valve member will, if correctly orientated, completely fill the lobe-shaped apertures through which each duct communicates with its adjacent ducts. The valve member is arranged so that it is rotatable about an axis co-incident with the principle axis of symmetry 119 of the imaginary cone on which the longitudinal axes of the ducts lie.

In this embodiment of the invention the valve member is pivotable about its axis to four operative positions. In each of the operative positions one of the ducts 114, 115, 116, 117 is placed in communication with the duct 139 but is sealed off from the other ducts. In FIGURES 13, 14 and 15 the valve member is shown as placing in communication the ducts 139 and 141. The longitudinal edges 151 of the valve member mate, on the one side, with the edges of the lobe-shaped aperture between the ducts 114 and 117 and, on the other side, with the edges of the lobe-shaped aperture between the ducts 114 and 115.

As in the previous embodiments of the invention, since the annular member 128 is interposed between the elliptical ducts and the plane E—E, the part elliptical lobe-shaped apertures are somewhat distorted at the ends near the plane E—E. However, the edges of the apertures lie on an ellipse between the annular member 128 and the point 127. Similarly the longitudinal edges 151 of the valve member also lie on ellipses, the longitudinal edge of the "ear" 149 lying on one ellipse and the longitudinal edge of the "ear" 150 lying on another ellipse. The valve member may be turned through multiples of 90° to cause the longitudinal edges 151 of the valve member to seal with the edges of the apertures in any of the ducts 114, 115, 116, 117. When the valve member is in any of these positions it will be apparent that fluid will be permitted to flow through from the duct 139 into whichever of the elliptical ducts the valve member seals off from the other ducts. As in previous embodiments, the operative surface 141 of the valve member provides a continuation of the duct with which it co-operates from the point 127, to the plane E—E and therefore to the duct 139.

Referring now to FIGURES 17, 18 and 19, these show a fourth embodiment of the invention which differs from the embodiment shown in FIGURES 13 to 16 only in the shape of the operative surface of the valve member. For this reason parts of the supporting structure of the valve member have been omitted for the sake of clarity but the supporting structure is identical to that described in relation to FIGURES 13 to 15, i.e. there will be an annular member surrounding the ducts at their intersection and a collar on the valve member carrying rollers which mate with bearing surfaces on the annular member. The ducts have been designated with the same numbers as in FIGURES 13 to 15 and they are arranged in precisely the same orientation.

In this fourth embodiment, the valve member is arranged so that pairs of adjacent ducts may be placed in communication with each other and with the duct 139 and simultaneously sealed off from the other pair of adjacent ducts. For this purpose, the valve member, shown clearly in FIGURE 19, comprises a pair of adjacent operative surfaces 152, 153, the surfaces adjoining along the line 154.

As in previous embodiments, each operative surface is a concave surface which is complementary to a cylinder having a cross-section identical to the cross-section of the elliptical ducts. The operative surfaces are formed as thin curved shells 155, 156 which are braced by a strut 157 of aero-foil cross-section. A trunnion block 158 is provided at the end of the valve member remote from the plane E—E and a sleeve 159 projects from the trunnion block and ends in a pulley 160. The sleeve 159 is supported by a fillet 161 outside the ducts.

Referring now to FIGURE 18, it will be seen that, in the position shown, the longitudinal edges 162, 162' of the valve member seal against the opposite edges of a pair of ducts rather than a single duct as in the embodiments shown heretofore. The extents of the operative deflecting surfaces 152 and 153 are chosen so that the valve member will fill the aperture between two of the ducts and the other two of the ducts as shown in FIGURE 18, thus producing a "double-bubble" section which gradually merges into the circle at the plane E—E. Since the operative surfaces are elliptical in section, they provide a smooth continuation of the ducts with which they are aligned. The valve member may be turned from the position shown in FIGURE 18 to any one of three other positions in which the valve member spans a pair of adjacent ducts and places the ducts of the pair in communication with each other and with the duct 139.

Both in the embodiment described with reference to FIGURES 13 to 16 and in the embodiment described with reference to FIGURES 17 to 19, the respective valve members extend from the plane E—E to a second plane F—F indicated in FIGURES 13 and 17. The plane F—F contains the points of intersection of the ducts furthest from the plane E—E. One of these points is indicated at 163 in each of FIGURES 13 and 17.

Referring now to FIGURES 23 to 26 there is shown a fifth embodiment of the invention which is similar in many respects to the embodiment described with reference to FIGURES 13 to 16. This fifth embodiment has four ducts 164, 165, 166 and 167 of identical elliptical cross-section. The ducts are orientated relatively to one another in the manner described with reference to FIGURES 13 to 16, so that their cross-sections project into a common circle on the plane G—G indicated in FIGURE 23. The ducts are embraced by an innular member 168 comprising annular elements 169 and 170, the annular element 170 having a bearing surface 171 parallel to the plane G—G and the annular element 169 having a bearing surface 172 parallel to the plane G—G.

A valve member shown in FIGURE 26 is mounted in the ducts at their intersection and comprises a collar 173 on which are mounted sets of rollers 174 and 175 which mate respectively with the bearing surfaces 171, 172 in a manner similar to that described in the previous embodiments of the invention. Also as in previous embodiments of the invention, the valve member comprises a thin shell 176 having an operative surface 177 which is a concave surface complementary to a cylinder having a cross-section identical to the cross-section of the elliptical ducts. In this fifth embodiment the valve member terminates at the end remote from the plane G—G in an arcuate edge 178 lying in a plane indicated at H—H in FIGURE 23 and corresponding to the plane F—F shown in FIGURES 13 and 17.

The valve member is accommodated by relieving the duct walls where the ducts intersect so that the re-entrant portions, terminating in the point 127, between the lobes 125,126 shown in FIGURE 22 are cut-off so that the ducts intersect in apertures which are bounded at one extremity by the plane H—H. Relieving the duct walls in this manner will produce an aperture at the duct intersection as indicated at 179 in FIGURE 25. This aperture is closed by a wall 180 shown in FIGURE 23. The shape of the aperture between each adjacent duct is that defined by the arcuate edge 178 of the valve member and one of its longitudinal edges 181, 182.

The valve member is provided on its underside with a reinforcing flanged channel section member 183 which runs from the collar 173 past a trunnion block 184 mounted on the underside of the valve member to the wall 180. A sleeve 185 projects from the trunnion block 184 through the wall 180 and is provided with a pulley 186.

The operation of this embodiment of the invention is similar to the embodiment of the invention described in FIGURES 13 to 16. In FIGURES 23 to 25 the valve member is shown as continuing the duct 164 and placing it in communication with a further duct 187 connected to the annular member 168. The valve member may be rotated about its axis to bring its longitudinal edges into sealing engagement with the edges of the apertures of other of the elliptical ducts to direct flow between any of the elliptical ducts and a further duct 187. This last embodiment described has an advantage over the embodiment described with reference to FIGURES 13 to 17, since in manufacturing practice it may be easier to weld in the wall 180 than to cause the ducts to intersect in a point as is necessary with the embodiment shown in FIGURES 13 to 16.

No seals have been shown in the last two embodiments since in some cases the seals may be dispensed with and the valve member made accurately to mate with the edges of the apertures.

It will be seen that the invention provides a valve structure of simple mechanical construction which permits flow diversion with a minimum of resistance being offered to the flow of fluids. The construction is very versatile and may be used to direct flow from one duct into one or more of a plurality of ducts. For example, although the embodiments of FIGURES 17 to 19 shows the diversion of fluid flow into a pair of adjacent ducts, a valve member could be made on the principles of the invention which would direct the flow into three adjacent ducts or a pair of opposed ducts as required.

Moreover, the actuating force required to actuate a valve member is relatively small since only mechanical friction has to be overcome, there are no fluid pressure loads to be overcome.

In the application to aircraft the slight elliptical section of the ducts does not induce any appreciable aerodynamic energy loss and so there is no loss of forward thrust when the valve member is in normal position as there is with some conventional types of gas diversion devices.

For instance, in a configuration in which the angle between the outlet ducts is 20°, the ratio of the length of the minor axis of the ellipse forming the cross section of the duct to the length of the major axis is cosine 10° or 0.9848. Thus the minor axis is 98.48% of the length of the major axis and the reforming of the gas flow after it leaves the circular tail pipe of an engine and enters the elliptical outlet ducts is negligible. It follows that in such a case the transition from a circular to an elliptical duct raises no manufacturing problems.

It will be understood that the forms of the invention herewith shown and described are preferred examples and various modifications can be carried out without departing from the spirit of the invention or the scope of the appended claims.

What I claim as my invention is:

1. Valve structure including first and second ducts of identical elliptical cross-section, a third duct, the longitudinal axes of all the ducts intersecting in a point and the first and second ducts being orientated relatively to one another so that their longitudinal axes are at an angle of $\theta$, the ratio of the length of the minor axis to the length of the major axis of the ellipse forming the cross-section of the first and second ducts being equal to the cosine of the angle $\theta/2$, and the minor axes of the cross-sectional ellipses of the first and second ducts being coplanar, the first and second ducts terminating adjacent to a first plane on to which their cross-sections project into a common circle, the centre of the circle being said point, the first and second ducts intersecting in substantially a semi-ellipse lying in a second plane normal to the first plane, means connecting the third duct to the first and second ducts at said circle, said means including an annular member surrounding the ducts at their intersection in said circle, first annular bearing surfaces on the annular member, said surfaces being parallel to the first plane, second annular bearing surfaces on the annular member, said surfaces being perpendicular to the first plane, a valve member located within the first and second ducts at their intersection, the valve member comprising a collar mounted within said annular member, sets of rollers so positioned on said collar for engaging said first and second bearing surfaces, and a thin curved shell mounted in said collar and having an operative deflecting surface which is part of the curved surface of an imaginary elliptical cylinder having a cross-section complementary to the cross-section of the first and second ducts, the valve member extending longitudinally between the first plane and a plane containing the point of intersection of the ducts furthest from the first plane, and means to rotate the valve member about an axis through said point and perpendicular to the first plane, the valve member being rotatable between first and second positions in which the valve member seals off the first and second ducts from one another, in both said first and second positions of the valve member longitudinal edges thereof lying substantially in said second plane and mating with the periphery of the semi-ellipse, in the first position the valve member directing fluid flow between the first and third ducts and in the second position the valve member directing fluid flow between the second and the third ducts.

2. Valve structure including first and second ducts of identical elliptical cross-section, a third duct, the longitudinal axes of all the ducts intersecting in a point and the first and second ducts being orientated relatively to one another so that their longitudinal axes are at an angle of $\theta$, the ratio of the length of the minor axis to the length of the major axis of the ellipse forming the cross-section of the first and second ducts being equal to the cosine of the angle $\theta/2$, and the minor axes of the cross-sectional ellipses of the first and second ducts being co-planar, the first and second ducts terminating adjacent to a first plane on to which their cross-sections project in a common circle, the centre of the circle being said point, the first and second ducts intersecting in substantially a semi-ellipse lying in a second plane normal to the first plane, means connecting the third duct to the first and second ducts at said circle, said means including an annular member surrounding the ducts at their intersection in said circle, first annular bearing surfaces on the annular member, said surfaces being parallel to the first plane, second annular bearing surfaces on the annular member, said surfaces being perpendicular to the first plane, a valve member located within the first and second ducts at their intersection, the valve member comprising a collar mounted within said annular member, sets of rollers so positioned on said collar for engaging said first and second bearing surfaces, and a thin curved shell mounted in said collar and having an operative deflecting surface which is part of the curved surface of an imaginary elliptical cylinder having a cross-section complementary to the cross-section of the first and second ducts, the valve member extending longitudinally between the first plane and a plane containing the points of intersection of the ducts furthest from the first plane, complementary sealing means on the collar and the annular member, and means to rotate the valve member about an axis through said point and perpendicular to the first plane, the valve member being rotatable between first and second positions in which the valve member seals off the first and second ducts from one another, said means including a shaft attached to the end of the valve member remote from the first plane, said shaft being coincident with said axis and extending to the exterior of the ducts, in both said first and second positions of the valve member longitudinal edges thereof lying substantially in said second plane and mating with the periphery of the semi-ellipse, in the first position the valve member directing fluid flow between the first and third ducts and in the second position the valve member directing fluid flow between the second and the third ducts.

3. Valve structure including a first duct of elliptical cross-section, the duct terminating adjacent to a first plane and extending therefrom, the longitudinal axis of the duct being at an angle to the plane and intersecting it and the ratio of the length of the minor axis to the length of the major axis of the ellipse forming the cross-section of the duct being equal to the cosine of the angle between the axis of the duct and the perpendicular to the plane through the point of its intersection with said longitudinal axis, whereby the cross-section of the duct projects on to the plane as a circle, the centre of the circle being said point of intersection and the diameter of the circle being equal to the major axis of the ellipse; a second duct communicating with the first duct through a substantially semi-elliptical aperture in the first duct, the edge of the aperture lying in a second plane perpendicular to the first plane and containing said perpendicular, an annular member surrounding the duct at the first plane, a first annular bearing surface on the annular member, said surface being perpendicular to said first plane, a second annular bearing surface on the annular member, said second surface being parallel to said first plane; a valve member in the aperture, the valve member comprising a collar mounted within said annular member, sets of rollers so positioned on said collar for engaging said first and second bearing surfaces, and an operative surface comprising a concave surface complementary to a cylinder of cross-section identical to the cross-section of the first duct; the valve member extending from the first plane to the point of intersection of the first and second ducts furthest from said first plane, a third duct connected to both the first and second ducts by said annular member, and means to pivot the valve member about an axis co-incident with said perpendicular between first and second positions in which an edge of the valve member mates with the edge of the aperture to seal off the first and second ducts from each other, in the first position the first duct being in communication with the third duct and in the second position the second duct being in communication with the third duct.

4. Valve structure including a first duct of elliptical cross-section, the duct terminating adjacent to a first plane and extending therefrom, the longitudinal axis of the duct being at an angle to the plane and intersecting it and the ratio of the length of the minor axis to the length of the major axis of the ellipse forming the cross-section of the duct being equal to the cosine of the angle between the axis of the duct and the perpendicular to the plane through the point of intersection of said longitudinal axis, whereby the cross-section of the duct projects on to the plane as a circle, the centre of the circle being said point of intersection and the diameter of the circle being equal to the major axis of the ellipse; a second duct communicating with the first duct through a substantially semi-elliptical aperture in the first duct, the edge of the aperture lying in a plane perpendicular to the first plane and containing said perpendicular, an annular member surrounding the duct at said first plane, a first annular bearing surface on the annular member, said surface being perpendicular to said first plane, a second annular bearing surface on the annular member, said surface being parallel to said first plane; a valve member in the aperture, the valve member comprising a collar mounted within said annular member, sets of rollers so positioned on said collar for engaging said first and second bearing surfaces, and an operative surface comprising a concave surface complementary to a cylinder of cross-section identical to the cross-section of the first duct; the valve member extending from the first plane to the point of intersection of the first and second ducts furthest from the first plane, complementary sealing means on the collar and the annular member, a third duct connected to both the first and second ducts by said annular member, and means to pivot the valve member about an axis co-incident with said perpendicular between first and second positions in which an edge of the valve member mates with the edge of the aperture to seal off the first and second ducts from each other, said means including a shaft connected to the valve member at the end thereof remote from said first plane, said shaft passing through the duct wall to the exterior thereof and being coincident with said perpendicular; in the first position of the valve member the first duct being in communication with the third duct and in the second position the second duct being in communication with the third duct.

5. Valve structure including at least three intersecting ducts of identical elliptical cross-section, the ducts terminating adjacent to a common plane and extending from the plane on the same side thereof, the longitudinal axes of the ducts intersecting in a point in the plane, the axes lying on the curved surface of an imaginary cone of which said point is the apex and being equally spaced apart around said surface, and the major axes of the cross-sectional ellipses being tangential to said curved surface, the common plane being perpendicular to the principal axis of symmetry of the cone, the ratio of the length of the minor axis to the length of the major axis of the ellipse forming the crosssection of the duct being equal to the cosine of the semi-angle of the cone, whereby the cross-sections of all the ducts project on to the common plane as a common circle, the centre of the circle being the point of intersection of said longitudinal axes on the plane and the diameter of the circle being equal to the major axis of said ellipse, the ducts intersecting in part-elliptical apertures having their edges lying in planes perpendicular to the common plane and containing said principal axis of symmetry of the cone, an annular member surrounding the ducts at their intersection in said common plane, said annular member being provided with a first annular bearing surface perpendicular to said common plane and a second annular bearing surface parallel to said common plane, a valve member in the ducts at their intersection, said valve member including a collar mounted within said annular member, sets of rollers so positioned on said collar for engaging said first and second bearing surfaces, and complementary sealing means between said collar and said annular member, an operative surface on the valve member comprising a single concave surface complementary to a cylinder of cross-section identical to the cross-section of the ducts, the valve member having an edge in the first plane, said edge being coincident with an arc of said cycle, the valve member extending from the common plane to a plane containing the points of intersection of the ducts furthest from said common plane, a further duct means connecting the further duct to all the other ducts at said common plane, and means to pivot the valve member about an axis co-incident with the principal axis of symmetry of the cone to cause edges of the valve member to mate with the edges of the part elliptical apertures of any one of the first-mentioned ducts, to seal said one duct off from the remainder of the first-mentioned ducts and to place it in communication with said further duct.

6. Valve structure including at least three intersecting ducts of identical elliptical cross-section, the ducts terminating adjacent to a common plane and extending from the plane on the same side thereof, the longitudinal axes of the ducts intersecting in a point in the plane, the axes lying on the curved surface of an imaginary cone of which said point is the apex and being equally spaced apart around said surface, and the major axes of the cross-sectional ellipses being tangential to said curved surface, the common plane being perpendicular to the principal axis of symmetry of the cone, the ratio of the length of the minor axis to the length of the major axis of the ellipse forming the cross-section of the duct being equal to the cosine of the semi-angle of the cone, whereby the cross-sections of all the ducts project on to the common plane as a common circle, the centre of the circle being the point of intersection of said longitudinal axes in the plane and the diameter of the circle being equal to the major axis of said ellipse, the ducts intersecting in part elliptical apertures having their edges lying in planes perpendicular to the common plane and containing said principal axis of symmetry of the cone, an annular member surrounding the ducts at their intersection in said common plane, said annular member being provided with a first annular bearing surface perpendicular to said common plane and a second annular bearing surface parallel to said common plane, a valve member in the ducts at their intersection, said valve member including a collar mounted within said annular member, sets of rollers so positioned on said collar for engaging said first and second bearing surfaces, and complementary sealing means between said collar and said annular member, an operative surface on the valve member comprising a pair of adjacent concave surfaces each surface being complementary to a cylinder of cross-section identical to the cross-section of the ducts, the valve member having an edge in the common plane, said edge being co-incident with an arc of said circle, the valve member extending from the common plane to a plane containing the points of intersection of the ducts furthest from said common plane, a further duct, means connecting the further duct to all the other ducts at said common plane, and means to pivot the valve member about an axis co-incident with the principal axis of symmetry of a cone to cause opposite edges of said operative surfaces to mate with edges of the part elliptical apertures of any two adjacent ducts to seal said two adjacent ducts off from the remainder of said first-mentioned ducts and to place said two adjacent ducts into communication with said further duct.

7. Valve structure including a plurality of intersecting ducts of identical elliptical cross-section, the ducts terminating adjacent to a common plane and extending from the plane on the same side thereof, the longitudinal axes of the ducts intersecting in a point in the plane, the axes lying on the curved surface of an imaginary cone of which said point is the apex and being equally spaced apart around said surface, the major axes of the cross-sectional ellipses being tangential to said curved surface, the common plane being perpendicular to the principal axis of symmetry of the cone, the ratio of the length of the minor axis to the length of the major axes of the ellipse forming the cross-section of the ducts being equal to the cosine of the semi-angle of the cone, whereby the cross-sections of all the ducts project on to the common plane as a common circle, the centre of the circle being the point of intersection of said longitudinal axes and the diameter of the circle being equal to the major axis of said ellipse, the ducts intersecting in apertures each having a straight edge defined by a second plane parallel to the common plane, said second plane containing the points of intersection of the ducts furthest from the common plane, an annular member surrounding the ducts at their intersection in said common plane, the annular member having a first annular bearing surface parallel to said common plane and a second annular bearing surface perpendicular to said common plane, a valve member in the ducts at their intersection, said valve member including a collar mounted within said annular member, sets of rollers so positioned on said collar for engaging the first and second bearing surfaces, and complementary sealing means on said annular member and collar, an operative surface on the valve member comprising a concave surface complementary to a cylinder of cross-section identical to the cross-section of the ducts, the valve member extending from the common plane to the second plane and having arcuately extending edges in both said planes, a further duct, means connecting the further duct to all the other ducts of said plurality at said common plane, and means to pivot the valve member about an axis co-incident with the principal axis of symmetry of the cone to cause edges of the valve member to mate with edges of the apertures to place any one of the ducts of the plurality into communication with said further duct while sealing off said one duct from the remainder of the ducts of the plurality.

References Cited in the file of this patent

UNITED STATES PATENTS

| | | |
|---|---|---|
| 162,382 | Hess | Apr. 20, 1875 |
| 362,917 | Exner | May 10, 1887 |
| 1,237,364 | Miller | Aug. 21, 1917 |
| 2,774,554 | Ashwood et al. | Dec. 18, 1956 |
| 2,879,014 | Smith et al. | Mar. 24, 1959 |

FOREIGN PATENTS

| | | |
|---|---|---|
| 340,236 | Great Britain | Dec. 16, 1930 |
| 997,961 | France | Sept. 19, 1951 |
| 1,025,715 | France | June 28, 1953 |